United States Patent
Batrouny et al.

(10) Patent No.: US 7,765,570 B2
(45) Date of Patent: Jul. 27, 2010

(54) MAINTAINING ACCURATE CHANNEL LINE-UP BY PERSISTENTLY MONITORING AVAILABILITY OF ACCESSIBLE CHANNELS

(75) Inventors: Talal Batrouny, Sammamish, WA (US); Kevin Shields, Bellevue, WA (US); Frederic Azera, Kirkland, WA (US); Cory Cirrincione, Redmond, WA (US); Elyssa Cox, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 11/761,595

(22) Filed: Jun. 12, 2007

(65) Prior Publication Data

US 2008/0313671 A1 Dec. 18, 2008

(51) Int. Cl.
*H04N 5/445* (2006.01)
*H04N 7/16* (2006.01)
*G06F 3/00* (2006.01)
*G06F 13/00* (2006.01)

(52) U.S. Cl. .......................... 725/49; 725/50; 725/151
(58) Field of Classification Search .................. 348/732
See application file for complete search history.

(56) References Cited

U.S. PATENT DOCUMENTS

| | | | | |
|---|---|---|---|---|
| 5,299,010 A | * | 3/1994 | Nakazawa et al. | 725/56 |
| 5,528,304 A | * | 6/1996 | Cherrick et al. | 725/41 |
| 5,841,433 A | * | 11/1998 | Chaney | 725/50 |
| 6,401,242 B1 | * | 6/2002 | Eyer et al. | 725/35 |
| 6,405,372 B1 | * | 6/2002 | Kim et al. | 725/50 |
| 6,580,452 B1 | * | 6/2003 | Gangitano | 348/180 |
| 6,580,768 B1 | | 6/2003 | Jaquette | |
| 6,708,335 B1 | * | 3/2004 | Ozer et al. | 725/20 |
| 6,757,912 B1 | * | 6/2004 | Vaughan et al. | 725/139 |
| 6,978,471 B1 | | 12/2005 | Klopfenstein | |
| 6,983,478 B1 | * | 1/2006 | Grauch et al. | 725/13 |
| 7,086,076 B1 | | 8/2006 | Park | |
| 7,140,032 B2 | | 11/2006 | Dew et al. | |
| 7,240,092 B2 | * | 7/2007 | Houghton et al. | 709/203 |
| 7,286,190 B2 | * | 10/2007 | Klopfenstein et al. | 348/569 |
| 7,373,650 B1 | * | 5/2008 | Rodriguez et al. | 725/41 |
| 2002/0083447 A1 | * | 6/2002 | Heron et al. | 725/38 |
| 2002/0186296 A1 | | 12/2002 | Gogoi et al. | |
| 2004/0261098 A1 | * | 12/2004 | Macrae et al. | 725/31 |

(Continued)

OTHER PUBLICATIONS

"Channel Guide / Lineup—Incorrect or Corrupted Lineup", available at least as early as Apr. 3, 2007 at <<http://kb.replaytv.com/index.php?_m=knowledgebase&_a=viewarticle&kbarticleid=11&nav=0>> Digital Networks North America, Inc., 2006, pp. 1-2.
"EPG Design", available at least as early as Apr. 3, 2007 at <<http://wiki.neurostechnology.com/index.php/EPG_Design>>, pp. 1-9.

*Primary Examiner*—Brian T Pendleton
*Assistant Examiner*—Ryan Stronczer
(74) *Attorney, Agent, or Firm*—Alleman Hall McCoy Russell & Tuttle LLP

(57) ABSTRACT

A channel updater. The channel updater maintains an accurate channel line-up by automatically testing accessible channels to determine if those channels are available for viewing. Available channels are added to the channel line-up, and unavailable channels are subtracted from the channel line-up. The updater persistently retests the channels so that changes in channel availability are reflected in the channel line-up.

17 Claims, 3 Drawing Sheets

U.S. PATENT DOCUMENTS

2005/0235318 A1* 10/2005 Grauch et al. ................. 725/46
2006/0195867 A1* 8/2006 Takehara et al. .............. 725/46
2006/0248562 A1 11/2006 Kitsukawa et al.
2007/0016932 A1* 1/2007 Franken et al. ................ 725/51
2007/0180473 A1* 8/2007 Song et al. .................... 725/58
2008/0256575 A1* 10/2008 Raju et al. .................... 725/39

* cited by examiner

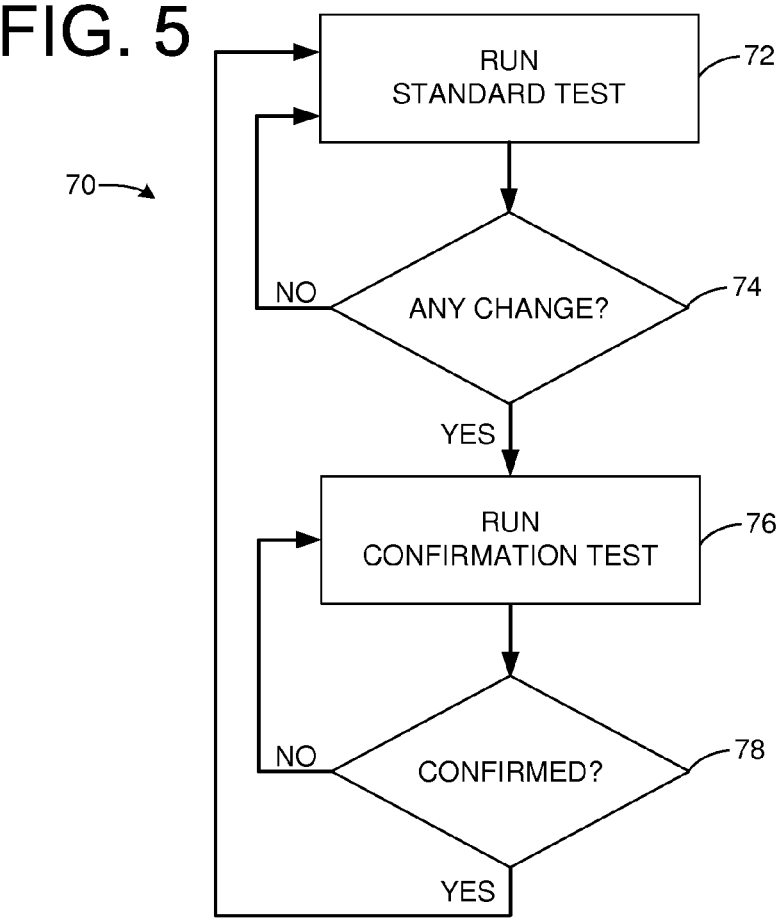

MAINTAINING ACCURATE CHANNEL LINE-UP BY PERSISTENTLY MONITORING AVAILABILITY OF ACCESSIBLE CHANNELS

BACKGROUND

Audio-visual content is available for consumption from a seemingly endless number of different content providers. Content providers deliver audio-visual programming to viewers via one or more channels. The various channels can be transmitted using a number of different methods, including over-the-air broadcasts, cable broadcasts, satellite broadcasts, and streaming Internet broadcasts. The location, hardware capabilities, and subscription packages of a user generally limits what channels are available to that user.

SUMMARY

A channel updater is provided. The channel updater maintains an accurate channel line-up by automatically testing accessible channels to determine if those channels are available for viewing. Available channels are added to the channel line-up, and unavailable channels are subtracted from the channel line-up. The updater persistently retests the channels so that changes in channel availability are reflected in the channel line-up.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows an exemplary program guide that displays changes to a channel line-up.

FIG. 5 shows a method of confirming detected changes to a channel line-up.

DETAILED DESCRIPTION

The present disclosure is directed to an updater that maintains an accurate channel line-up. The updater automatically updates the channel line-up to accurately reflect the channels that are actually available to a user. The updater is able to determine when channels become available and can add newly available channels to the channel line-up. Similarly, the updater is able to determine when channels are no longer available and can subtract those channels from the channel line-up. In this way, the updated channel line-up offers a user the full range of available channels without burdening the user with channels that are not actually available. The updater persistently works to maintain an accurate line-up, even when the channel line-up changes without warning.

Figure 1:
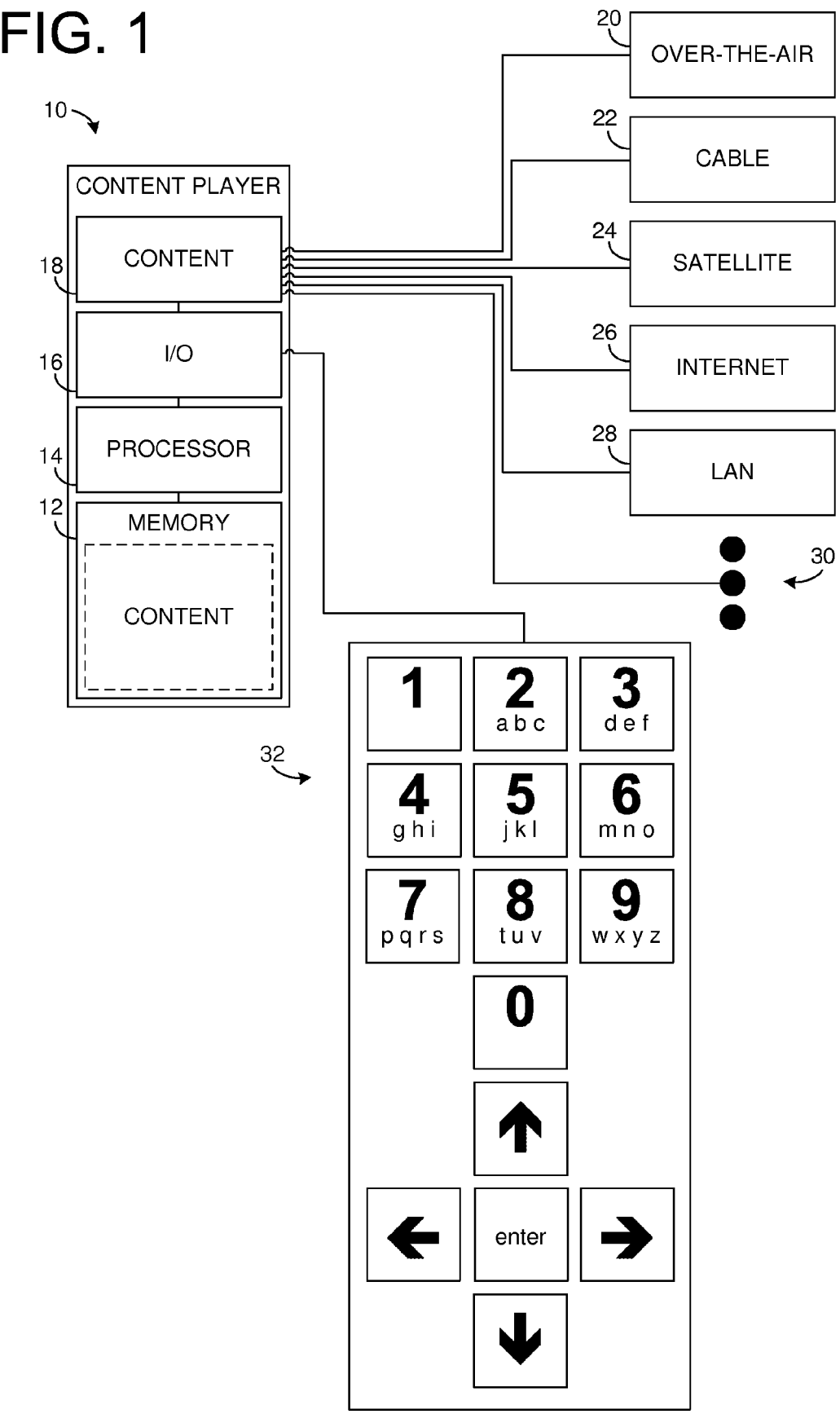
FIG. 1 shows a content player capable of playing content received from a plurality of heterogeneous content sources.

FIG. 1 schematically shows an exemplary content player 10 designed to implement a channel updater in accordance with the present disclosure. It should be understood that content player 10 is provided only as one possible device capable of implementing a channel updater. As such, the exemplary configuration of content player 10 should be considered in a nonlimiting sense. Media center computers, televisions, game consoles, set-top boxes, mobile devices, and Internet content playback devices are nonlimiting examples of the various different types of content players that can be configured to implement the herein disclosed channel updater. Such devices may be variously configured without departing from the scope of this disclosure.

Content player 10 is a media center computer that includes a memory 12, a processor 14, an I/O subsystem 16, and a content subsystem 18. Content subsystem 18 is configured to receive audio-visual content from one or more sources. In particular, content subsystem 18 receives content from over-the-air source 20, cable source 22, satellite source 24, Internet source 26, and LAN source 28. As indicated by dots 30, the content subsystem may be further configured to receive content from other sources. It should be understood that a device is not required to receive content from all of the above listed sources. In fact, the herein disclosed channel updater can be used with a device that receives content from a single source or virtually any combination of two or more sources, including homogeneous content sources and/or heterogeneous content sources.

Content subsystem 18 can include one or more tuners for directly receiving content broadcast from a source provider. Content subsystem 18 can additionally or alternatively include an interface for communicating with an external device that receives broadcasts, such as an external cable box or satellite receiver. Likewise, the content subsystem can be adapted to use CableCARD technology to receive content. Furthermore, the content subsystem may include an antenna, or an interface for adding an antenna, to improve reception of wireless signals. The content subsystem can optionally communicate with the Internet and/or another computer network via virtually any suitable wired or wireless connection.

Memory 12 can include volatile memory, nonvolatile memory, or a combination thereof. Nonlimiting examples of devices that can at least partially constitute memory 12 include hard drives, nonvolatile semiconductor memory, volatile semiconductor memory, and optical media.

Content received via content subsystem 18 can be stored in memory 12, although this is not required. Embodiments that are designed to store content in memory 12 can allow a user to time-shift programming so that it can be viewed at the user's convenience. Furthermore, some devices may be designed to record content while other content is being played.

Memory 12 also can be used to store an operating system and/or other software that can be used to implement the herein described channel updater. In other words, memory 12 may include instructions that can be executed by processor 14. When executed, such instructions can update a channel line-up as described below. It should be understood that channel updating instructions are not required to be stored in memory 12.

Among other tasks, processor 14 can manage the recording of content into memory 12. Furthermore, the processor may be used to manage the display of various user interfaces that can help a user control content player 10. As used herein, processor 14 may include one or more hardware and/or firmware devices.

I/O subsystem 16 is designed to receive user inputs, to output or present audio-visual content, and in some embodiments, to output other types of information and/or commands to other devices.

The I/O subsystem can include one or more interfaces for delivering audio-visual information to an external screen and/or sound system. Nonlimiting examples of such interfaces include HDMI, DVI, UDI, VGA, RCA, Component Video, Composite Video, S-Video, SCART, Coaxial Cable, and TOSLINK. In some embodiments, a content player can include one or more built-in screens that are suitable for presenting video content, as well as one or more speakers for presenting audio content.

The I/O subsystem can be designed to receive a variety of different user inputs. FIG. 1 shows a nonlimiting example of a keypad 32 that a user can use to issue such inputs or commands. Such a keypad can be located on a remote control or on the content player itself. Such a keypad can additionally or alternatively be implemented as a virtual keypad (e.g., a keypad presented on a screen).

As described above with reference to content subsystem 18, content player 10 is capable of receiving content from a variety of different sources. As the number of channels available from each source continues to increase, and as the number of different sources increases, it becomes increasingly difficult to maintain a channel line-up that accurately reflects which channels are actually available to a user. This can make basic television viewing and channel surfing a cumbersome and frustrating experience.

In the past, if a user desired to maintain an accurate channel line-up, the user would manually add/enable available channels to the channel line-up using whatever remedial tools the device offered for such a task. Oftentimes, a user would not remember to frequently check to see if previously unavailable channels had become available. As a result, the user often missed the opportunity to view newly available channels.

Another issue arose when a previously available channel became unavailable. This could happen when a user changed subscriptions, a content provider changed its offerings, inclement weather affected reception, etc. The unavailable channels would remain in a user's channel line-up, even though such channels were not available for viewing. This made finding content that actually was available more difficult, and it could greatly frustrate a user by tempting the user with content that could not be obtained. In such situations, the user had to recognize that the channel line-up included unavailable channels, and manually remove/disable such channels.

Figure 2:
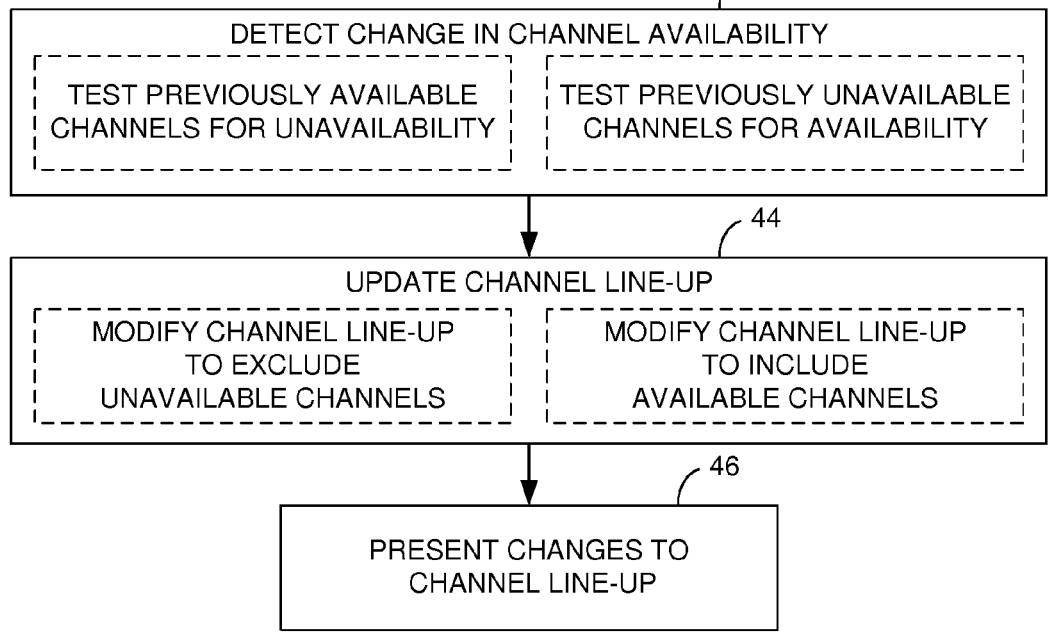
FIG. 2 shows a method of maintaining an accurate channel line-up.

The herein disclosed channel updater overcomes at least some of the issues associated with channel line-ups that change over time. FIG. 2 shows a nonlimiting example of an updating method 40 that helps maintain an accurate channel line-up, thereby facilitating channel selection. At 42, the method includes detecting a change in channel availability. Changes in channel availability can be detected by testing previously available channels for unavailability and/or testing previously unavailable channels for availability.

A nonlimiting example of a channel detection procedure includes automatically attempting to tune to each accessible channel to determine if it is currently available. Once tuned to a particular channel, the signal from that channel can be analyzed to determine if it is available for viewing. The type of analysis used to determine if a channel is available for viewing can be adapted to the particular source from which that channel is being received. For example, an over-the-air broadcast can be analyzed to determine if there is a signal of sufficient strength, a cable broadcast or satellite broadcast can be analyzed to determine if there is an unencrypted signal, and an Internet broadcast can be analyzed to determine if a streaming connection can be established with the content provider. In this way, the updater can be used to test channels from a plurality of heterogeneous content sources. As such, the updater can maintain a comprehensive channel line-up including channels from a plurality of heterogeneous content sources.

Channel availability can be persistently tested. In other words, updaters according to the present disclosure do not merely perform a single test when manually instructed to do so by a user. Instead, the updaters persistently, or repeatedly, retest the line-up in an attempt to maintain accuracy as the line-up changes over time. As used herein, persistent testing includes testing at fixed or variable intervals of virtually any duration. It is to be understood that the word persistently is used to refer to the reoccurring nature of the testing over a period of time. The word persistently is not intended to limit this disclosure to applications in which testing is performed continuously without any interruption. To the contrary, there can be breaks of virtually any duration between testing sessions.

Oftentimes, changes in the channel line-up are unexpected. Therefore, persistent testing helps ensure that the line-up will remain accurate. The accuracy of the line-up can be improved by increasing the frequency of testing. On the other hand, decreasing the frequency of testing can free device resources for other tasks. Virtually any testing frequency can be used without departing from the scope of the present disclosure.

A channel line-up can be persistently tested for accuracy according to a fixed schedule. Depending on the number of accessible channels, testing all accessible channels can take a long time. As such, testing can be automatically scheduled for times when a user is less likely to be using the content player, although this is not required. For example, the updater may schedule testing at 2 a.m. on a daily basis. A fixed schedule can include testing times that vary from day to day (e.g., 2 a.m. on weekdays and 4 a.m. on weekends), and/or more than one testing time in the same day. Furthermore, a fixed schedule does not need to test on a daily basis. Testing can occur every other day, once a week, or on another schedule. Testing can even be split so that some channels are tested at one time, while other channels are tested at a different time. It is to be understood that virtually any schedule can be used.

In some embodiments, a device may assess the time when a user is least likely to be using the content player. In other words, the device may schedule testing based on previous viewing habits. For example, the device may schedule daily testing at 2 a.m. when a user is sleeping and at 10 a.m. on weekdays when a user is at work.

A scheduled test can be postponed when interrupted by other device activity. In other words, the content player can make testing a low priority. In this manner, device performance will not be negatively affected when the resources of the content player are needed for tasks other than testing.

Some content players may include two or more tuners. Such devices may be able to concurrently test two or more channels for availability. In some embodiments, a content player can be used to view or record content with one tuner, while concurrently background testing channel availability with another tuner. In some embodiments, two or more content players, such as networked content players, can cooperate to test different channels for accessibility and then share the results of the testing with each other.

At 44, method 40 includes updating the channel line-up responsive to detecting a change in channel availability. This can be done by modifying the channel line-up to exclude unavailable channels that were previously available and/or modifying the channel line-up to include available channels that were previously unavailable.

According to the present disclosure, the channel line-up can dynamically adapt when channel availability changes. For example, the updated channel line-up can include channels that are provided for a limited time on a promotional basis. As another example, the updated channel line-up can include newly offered channels. As still another example, the updated channel line-up can exclude channels that become temporarily or permanently unavailable. Such changes can be made automatically without user input. Persistent testing facilitates identifying changes in channel availability in a timely fashion so that corresponding changes can be made to maintain an accurate channel line-up.

The content player can use the updated channel line-up to define which channels are presented for selection in a program guide, which channels are tuned to when a user surfs through the channels, etc. Because only available channels are included in the updated channel line-up, unavailable channels do not detract from the user experience. Furthermore, because all available channels are included in the updated channel line-up, all viewing options are available to a user.

It is to be understood that a user may override the updater. For example, a user may instruct a content player to never include certain channels in the channel line-up, even though such channels are available. Similarly, a user may instruct a content player to always include certain channels in the channel line-up, even if such channels are unavailable. In such cases, the updater can continue to update those channels for which the user has not provided overriding instructions.

At 46, updating method 40 includes presenting changes to the channel line-up. In other words, a user can be notified of any modifications to the channel line-up. Such notifications provide a user with information relating to the changes in channel availability.

Figure 3:
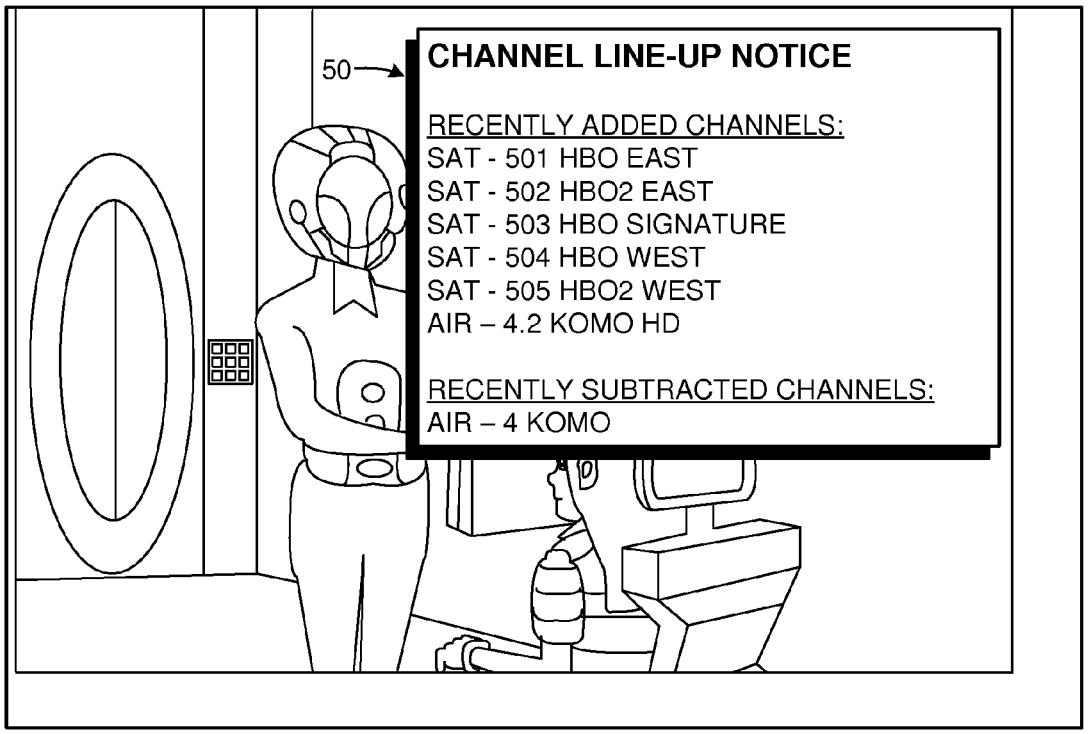
FIG. 3 shows an exemplary notification window that displays changes to a channel line-up.

FIG. 3 shows a nonlimiting example of how changes to the channel line-up can be presented to a user. In particular, FIG. 3 shows a notification window 50 that is displayed after the channel line-up is updated. In the illustrated example, notification window 50 alerts the user to the availability of six new channels (i.e., satellite channels 501, 502, 503, 504, and 505; and over-the-air channel 4.2). The notification window also alerts the user to the unavailability of one channel (i.e., over-the-air channel 4). As can be seen, five of the newly available channels are satellite channels, and one of the newly available channels is an over-the-air broadcast. This reiterates the ability of the updater to maintain an accurate channel line-up from a plurality of heterogeneous content sources.

FIG. 4 shows another nonlimiting example of how changes to the channel line-up can be presented to a user. In particular, FIG. 4 presents a program guide 60 with the updated channel line-up. Program guide 60 alerts the user to the availability of channel 4.2 and also alerts the user to the unavailability of channel 4.

In the illustrated embodiment, the program guide depicts available channels that were previously unavailable differently than available channels that were previously available. For example, as shown at 62, newly added channel 4.2 is depicted with an asterisk and double underlining. In this way, newly added channel 4.2 is visually set off when compared to the other available channels, which were not recently added to the channel line-up. It should be understood that the appearance of the newly available channels can be visually set off in virtually any manner, and the exemplary asterisk and underlining is only provided as a nonlimiting example. In some embodiments, a sidebar, portion of a guide, or other graphical element can be made to change appearance to alert users to changes in channel availability. As nonlimiting examples, appearance can be changed by changing color, simulating glowing, etc. In some embodiments, a newly added channel can be presented with a different visual appearance than another newly added channel. As a nonlimiting example, a free preview channel can be color coded differently than other newly added channels to better alert a user of the limited opportunity to take advantage of the free preview. In general, the user interface can be adapted to facilitate user discovery of changes in channel availability.

The user interface may also be adapted to allow a user to quickly and easily take further action with newly available channels. As a nonlimiting example, a button or other graphical element can be presented to the user, thus allowing the user to choose those newly added channels that interest the user. In this way, the user can add selected channels to the line-up, without diluting the line-up with channels that do not interest the user.

Program guide 60 also depicts unavailable channels that were previously available differently than unavailable channels that were previously unavailable. In fact, unavailable channels that were previously unavailable are not included in program guide 60. Keeping the unavailable channels out of the program guide facilitates channel selection. However, as shown in FIG. 4, the updater can optionally present recently subtracted channels for some time, thereby alerting a user to the removal of the channel from the channel line-up. For example, as shown at 64, newly subtracted channel 4 is depicted with a lighter font and in italics. In this way, newly subtracted channel 4 is visually set off. It should be understood that the appearance of the newly subtracted channels can be visually set off in virtually any manner, and the exemplary light font and italics is only provided as a nonlimiting example. In some embodiments, an icon or symbol can be used to indicate channels that have recently become unavailable. In some embodiments, newly subtracted channels will be blocked from selection in a program guide.

The above described notification window and program guide are two nonlimiting examples of how changes in a channel line-up can be presented to a user. It should be understood that virtually any other notification can be provided. For example, a content player can be configured to automatically email a user when there is a change in channel availability. As another example, a content player can be configured to scroll a list of changes to the channel line-up at the bottom of the screen. Such notification techniques may provide a user with enough time to troubleshoot the change, thus avoiding accidentally missing an important program due to unavailability. Notifications are particularly useful with content players that are configured to record content, as content scheduled to be recorded on a channel excluded from the line-up due to unavailability may result in a failed recording. A notification can provide a user with advanced warning of this potential problem.

Changes to the channel line-up can be presented to the user for virtually any length of time. As a nonlimiting example, changes may only be presented in the viewing session immediately following the changes to the channel line-up. As another example, changes may be presented for a fixed duration after the changes are made (e.g., 1 day, 2 days, 1 week, etc.). As yet another example, changes may be presented until the user acknowledges the changes, such as by pressing an enter key when asked to acknowledge the changes.

Some operations of the content player can be set up to handle situations in which channel availability changes. As a nonlimiting example, when a user programs a content player to record a program that is showing on a newly added channel, the content player can be programmed to warn the user that the newly added channel may become unavailable before the program airs. In some embodiments, the content player may check future channel availability to determine if the program can be recorded. For example, this can be accomplished by querying a database that maintains channel availability information.

The channel line-up can be persistently tested for accuracy according to an adaptable schedule in which additional testing is used to confirm previously detected changes. For example, FIG. 5 shows a nonlimiting example of an adaptable testing method 70. At 72, the adaptable testing method includes running a standard test. In other words, tests can be run according to whatever fixed schedule is normally used in order to detect changes in channel availability. At 74, the method includes determining if the testing detects any changes to the channel line-up. If no changes are detected, testing proceeds according to the normal fixed schedule. If a change is detected, one or more confirmation tests are run at 76. At 78, the method includes confirming if the detected changes are accurate.

Once a test result is sufficiently confirmed, as described below, standard testing on a fixed schedule can be resumed. In the meantime, confirmation testing can continue until the test results are sufficiently confirmed. Such confirmation testing can include testing the effected channels one or more times after the first test that originally detects a change in the channel line-up. Standard testing can continue on a normal schedule while confirmation testing is being run. For example, a test can be run for all channels at 2 a.m. every day, while channels that have recently become available or unavailable are further tested at hourly intervals between the standard tests.

Confirmation testing can be run at an increased frequency compared to standard testing. In other words, the testing frequency can be increased for previously available channels that have become unavailable and/or previously unavailable channels that have become available. In this manner, if regular testing determines that a particular channel is unavailable, that channel can be closely monitored to see if it later becomes available. That channel may not be excluded from the channel line-up until after at least one confirmation test confirms unavailability. Likewise, if regular testing determines that a particular channel is available, that channel can be closely monitored to see if it later becomes unavailable. In such cases, that channel may be included in the channel line-up on a probationary basis until it remains available for a predetermined qualifying period (e.g., at least one week).

The logic used to confirm test results can be adapted to account for anticipated changes to a channel line-up. For example, if channels are often offered on a promotional basis for one week periods, a channel may be closely monitored at least one week after it becomes available so that it can be removed from the channel line-up after the promotional period ends. As another example, if over-the-air broadcasts and satellite broadcasts frequently suffer from inclement weather conditions, those types of channels can be frequently tested immediately after the channel becomes unavailable. Other heuristics can be used to improve the accuracy of the channel line-up, and the above types of confirmation testing are provided as nonlimiting examples.

Although the subject matter of the present disclosure has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of maintaining accuracy in a channel line-up of a content player, comprising:
   persistently retesting previously available channels for unavailability, on the content player;
   self-modifying the channel line-up on the content player to exclude unavailable channels that were previously available channels;
   persistently retesting previously unavailable channels for availability, on the content player;
   self-modifying the channel line-up on the content player to include available channels that were previously unavailable channels;
   wherein testing frequency is increased for one or both of: previously available channels that have become unavailable and previously unavailable channels that have become available.

2. The method of claim 1, further comprising providing notification of modifications to the channel line-up.

3. The method of claim 2, where providing notification includes displaying a list that includes available channels that were previously unavailable.

4. The method of claim 2, where providing notification includes displaying a list that includes unavailable channels that were previously available.

5. The method of claim 2, where providing notification includes displaying a program guide that depicts unavailable channels that were previously available differently than unavailable channels that were previously unavailable.

6. The method of claim 2, where providing notification includes displaying a program guide that depicts available channels that were previously unavailable differently than available channels that were previously available.

7. The method of claim 1, where the channel line-up is persistently tested for accuracy according to a fixed schedule.

8. The method of claim 1, where the channel line-up is persistently tested for accuracy according to an adaptable schedule.

9. The method of claim 1, where a channel is only excluded from the channel line-up after a confirmation test confirming unavailability.

10. The method of claim 1, where a channel is included in the channel line-up on a probationary basis until that channel remains available for a qualifying period.

11. The method of claim 1, including persistently retesting channels from a plurality of heterogeneous content sources.

12. The method of claim 1, where the channel line-up is a comprehensive line-up including channels from a plurality of heterogeneous content sources, and where the comprehensive line-up is maintained with persistent retesting and modification.

13. A method of facilitating channel selection on a content player, comprising:
   detecting a change in channel availability on the content player;
   updating a channel line-up on the content player responsive to detecting the change;
   presenting changes to the channel line-up via the content player;
   increasing frequency at which channel availability is tested responsive to detection of a previously available channel that has become unavailable or a previously unavailable channel that has become available.

14. The method of claim 13, where detecting a change in channel availability includes detecting availability of a previously unavailable channel.

15. The method of claim 13, where presenting changes to the channel line-up includes displaying a program guide that depicts available channels that were previously unavailable differently than available channels that were previously available.

16. The method of claim 13, where presenting changes to the channel line-up includes displaying a program guide that depicts unavailable channels that were previously available differently than unavailable channels that were previously unavailable.

17. A content player memory comprising machine executable instructions for self-maintaining accuracy in a channel line-up on a content player, where, upon execution, the instructions provide for:
persistently retesting previously available channels for unavailability;
self-modifying the channel line-up to exclude unavailable channels that were previously available channels;
persistently retesting previously unavailable channels for availability;
self-modifying the channel line-up to include available channels that were previously unavailable channels;
wherein testing frequency is increased for one or both of: previously available channels that have become unavailable and previously unavailable channels that have become available.

* * * * *